United States Patent

Warnick et al.

(10) Patent No.: US 10,127,509 B2
(45) Date of Patent: Nov. 13, 2018

(54) SYSTEM FOR TEMPORARILY SUSPENDING A WORKFLOW ASSOCIATED WITH A WORK ITEM

(71) Applicant: BANK OF AMERICA CORPORATION, Charlotte, NC (US)

(72) Inventors: David Lee Warnick, Rising Sun, MD (US); Hudson Philip Hoen, IV, Ponte Vedra Beach, FL (US); Andrew Sheldon, Mountain Top, PA (US); Jason Nicolas Alexandrian, Braselton, GA (US); Jason P. Gardner, Murphy, TX (US); Luis Felipe Lecaro Saborio, Wilmington, DE (US); Brian Robert Camphausen, Elkton, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 657 days.

(21) Appl. No.: 14/857,304

(22) Filed: Sep. 17, 2015

(65) Prior Publication Data

US 2017/0083847 A1    Mar. 23, 2017

(51) Int. Cl.
  *G06F 3/00*      (2006.01)
  *G06F 9/44*      (2018.01)
  *G06F 9/46*      (2006.01)
  *G06F 13/00*     (2006.01)
  *G06Q 10/06*     (2012.01)

(52) U.S. Cl.
  CPC .............................. *G06Q 10/06316* (2013.01)

(58) Field of Classification Search
  None
  See application file for complete search history.

(56) References Cited

U.S. PATENT DOCUMENTS

| | | | |
|---|---|---|---|
| 6,151,583 A | 11/2000 | Ohmura et al. | |
| 8,069,070 B2 | 11/2011 | Papili et al. | |
| 2007/0038499 A1* | 2/2007 | Margulies | G06Q 10/06 705/7.26 |
| 2007/0156485 A1 | 7/2007 | Sanabria et al. | |
| 2007/0156888 A1 | 7/2007 | Hilerio et al. | |
| 2007/0162317 A1 | 7/2007 | Papili et al. | |
| 2009/0157682 A1* | 6/2009 | Gupta | G06F 11/3466 |
| 2010/0169146 A1* | 7/2010 | Hoyne | G06Q 10/109 705/7.21 |
| 2011/0252422 A1 | 10/2011 | Rothert et al. | |

FOREIGN PATENT DOCUMENTS

JP         4912927 B2     4/2012

* cited by examiner

*Primary Examiner* — Craig C Dorais
(74) *Attorney, Agent, or Firm* — Michael A. Springs; Moore & Van Allen PLLC; Anup Shrinivasan (57) ABSTRACT

Embodiments of the invention are directed to systems, methods, and computer program products for temporarily suspending a workflow associated with a work item. The system is configured to establish a communicable link with a queue to retrieve a first work item. The system is configured to receive a notification from a first device, where the notification comprises a second work item. The system temporarily suspends the first work item and the work flow associated with the first work item, in response to receiving the second work item from the first device. Once the system determines execution of a user action associated with the second work item, it restores the suspended first work item and the one or more suspended sessions associated with the first work item.

20 Claims, 3 Drawing Sheets

SYSTEM FOR TEMPORARILY SUSPENDING A WORKFLOW ASSOCIATED WITH A WORK ITEM

FIELD

In general, embodiments of the invention relate to electronic management workflows for multiple work items efficiently by temporarily suspending electronically a workflow for one work item to allow for performance of one or more actions required for another work item.

BACKGROUND

Employees of an organization are often required to multitask and apply their efforts to many open streams of work. In this regard, an employee may have to open several interfaces to operate on multiple overlapping work items on a workstation resulting in a cluttered workspace. In addition, having multiple overlapping work items running simultaneously may result in increased load on the processor and impedes processing time for each work item being measured.

There is a need for a system to enable the user to temporarily suspend a workflow associated with an active work item when requested to perform one or more actions on a second incoming work item.

BRIEF SUMMARY

Embodiments of the present invention address the above needs and/or achieve other advantages by providing apparatuses (e.g., a system, computer program product, and/or other device) and methods for temporarily suspending a workflow associated with a work item. The present invention provides the functional benefit of efficiently organizing multiple work items for processing and ensuring an uncluttered workspace. In this regard, the present invention is used in the improvement of the workflow management organization by establishing a dedicated system for the handling of ad-hoc work items when operating on another stream of work.

In some embodiments, a system for temporarily suspending a workflow associated with a work item is presented. The system comprises one or more memory devices, wherein the one or more memory devices comprise a volatile memory and a non-volatile memory, wherein the volatile memory and the non-volatile memory are independent of each other; one or more processing devices operatively coupled to the one or more memory devices; and computer instruction code stored in the one or more memory devices and structured to cause the one or more processing devices to establish a communicable link with a queue to retrieve a first work item, wherein the first work item comprises one or more rules, one or more sessions, one or more priority levels, and one or more user interfaces; process the first work item, wherein processing the first work item comprises executing one or more sessions associated with the first work item, wherein the one or more sessions is executed using the one or more user interfaces associated with the first work item; receive a notification from a first device, wherein the notification comprises a second work item, wherein the second work item requires a user action; retrieve the second work item, wherein retrieving the second work item comprises temporarily suspending the first work item and the work flow associated with the first work item in response to receiving the second work item from the first device, wherein processing the second work item comprises disconnecting the established communicable link with the queue; determine execution of the user action associated with the second work item; and restore the first work item and the one or more suspended sessions associated with the first work item based on at least determining the execution of the user action, wherein restoring the first work item and the one or more suspended sessions further comprises re-establishing the communicable link with the queue.

In some embodiments, temporarily suspending the first work item and the work flow associated with the first work item further comprises storing the one or more user interfaces and the one or more rules associated with the first work item in the volatile memory, thereby reducing a workload and increasing processing time during the processing of the second work item.

In some embodiments, the module is configured to further cause the one or more processing devices to initiate presentation of one or more user interfaces associated with the second work item; and determine the execution of the user action associated with the second work item using one or more user interfaces associated with the second work item, wherein executing further comprises updating the second work item.

In some embodiments, the module is configured to further cause the one or more processing devices to determine a priority level associated with the second work item, wherein the priority level associated with the second work item is higher than the priority level associated with the first work item.

In some embodiments, restoring the first work item and the one or more suspended sessions associated with the first work item further comprises restoring the one or more user interfaces associated with the first work item.

In some embodiments, the module is further configured to cause the one or more processing devices to: receive one or more authentication credentials from the user in response to restoring the first work item and the one or more suspended sessions associated with the first work item; validate the one or more authentication credentials to determine a user access associated with restoring the first work item and the one or more suspended sessions associated with the first work item; retrieve the first work item and the one or more suspended sessions associated with the first work item from the volatile memory in response to successfully validating the one or more authentication credentials; and restore the first work item and the one or more suspended sessions associated with the first work item.

In some embodiments, the module is further configured to further cause the one or more processing devices to establish a communicable link with the first device to retrieve the second work item in response to disconnecting the communicable link with the queue.

In another aspect, a computer program product for temporarily suspending a workflow associated with a work item is presented. The computer program product comprises a non-transitory computer-readable medium comprising code causing a first apparatus to establish a communicable link with a queue to retrieve a first work item, wherein the first work item comprises one or more rules, one or more sessions, one or more priority levels, and one or more user interfaces; process the first work item, wherein processing the first work item comprises executing one or more sessions associated with the first work item, wherein the one or more sessions is executed using the one or more user interfaces associated with the first work item; receive a notification from a first device, wherein the notification comprises a second work item, wherein the second work item requires a user action; retrieve the second work item, wherein retrieving the second work item comprises temporarily suspending the first work item and the work flow associated with the first work item in response to receiving the second work item from the first device, wherein processing the second work item comprises disconnecting the established communicable link with the queue; determine execution of the user action associated with the second work item; and restore the first work item and the one or more suspended sessions associated with the first work item based on at least determining the execution of the user action, wherein restoring the first work item and the one or more suspended sessions further comprises re-establishing the communicable link with the queue.

In yet another aspect, a computer implemented method for temporarily suspending a workflow associated with a work item is presented. The method comprises establishing a communicable link with a queue to retrieve a first work item, wherein the first work item comprises one or more rules, one or more sessions, one or more priority levels, and one or more user interfaces; processing the first work item, wherein processing the first work item comprises executing one or more sessions associated with the first work item, wherein the one or more sessions is executed using the one or more user interfaces associated with the first work item; receiving a notification from a first device, wherein the notification comprises a second work item, wherein the second work item requires a user action; retrieving the second work item, wherein retrieving the second work item comprises temporarily suspending the first work item and the work flow associated with the first work item in response to receiving the second work item from the first device, wherein processing the second work item comprises disconnecting the established communicable link with the queue; determining execution of the user action associated with the second work item; and restoring the first work item and the one or more suspended sessions associated with the first work item based on at least determining the execution of the user action, wherein restoring the first work item and the one or more suspended sessions further comprises re-establishing the communicable link with the queue.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, an insurance account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g., an account holder or a person who has an account (e.g., banking account, credit account, brokerage account or the like) at the entity) or potential customer (e.g., a person who has submitted an application for an account, a person who is the target of marketing materials that are distributed by the entity, a person who applies for a loan that not yet been funded). In other embodiments, the "user" may refer to an employee of the entity.

In some embodiments, a "work item" may refer to any task that may require one or more actions to be taken by a user for completion.

Figure 1:
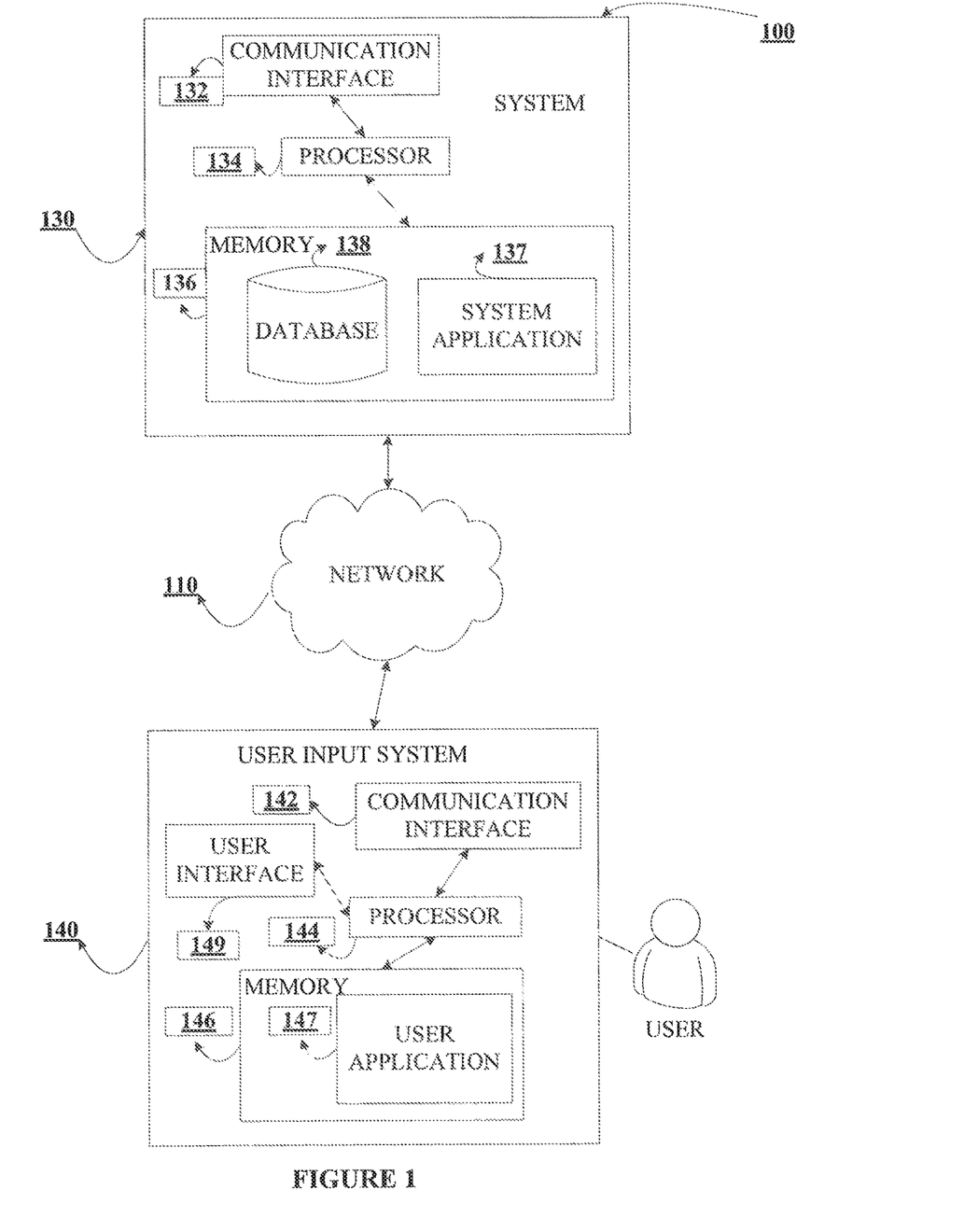
FIG. 1 illustrates an exemplary block diagram of the system environment in accordance with an aspect of the present invention.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Figure 2:
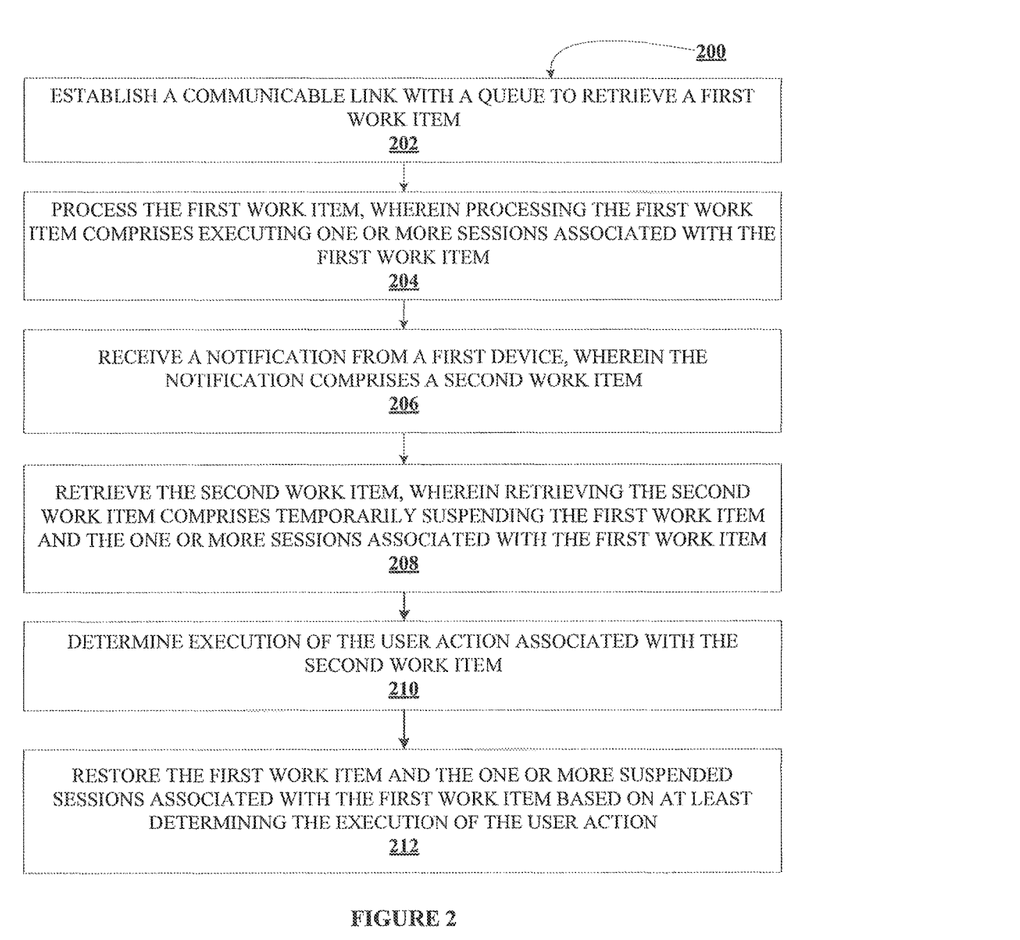
FIG. 2 illustrates a high level process flow for temporarily suspending a workflow associated with a work item in accordance with an aspect of the present invention.

FIG. 2 illustrates a high level process flow for temporarily suspending a workflow associated with a work item 200, in accordance with an embodiment of the invention. Typically, a workflow is a set of activities (e.g., service requests, objectives, tasks, or the like) and the rules that govern a work item's behavior during operation until the work item is completed. As shown in block 202, the process flow includes establishing a communicable link with a queue to retrieve a first work item. The link comprises a set of electronics assemblies, including a transmitter and a receiver and the interconnecting data telecommunication circuit governed by one or more link protocols enabling data to be transferred from a data source to a data sink. In a typical implementation, the queue may have a first-in-first-out (FIFO) structure using which a user may access a work item. In this regard, the first work item being placed in the queue will be the first work item accessible to the user under the FIFO structure. In other implementations, the queue may not have a FIFO structure.

In some embodiments, the first work item includes one or more rules, one or more sessions, one or more priority levels, and/or one or more user interfaces. The rules, sessions, priority levels, and the user interfaces, together characterize the workflow of the work item. The one or more rules may include a legal regulation, an internal policy, a client request, and/or other operational decisions defined, tested, executed, and maintained by the entity. The sessions may include one or more stages and/or objectives that need to be completed by the user for successful execution of the work item. In one aspect, each work item may be associated with a priority level. In some embodiments, each stage and/or objective may be associated with a priority level designed to characterize the impact of the work item to business and serve as a means for escalation. For example, a priority level may be represented numerically (e.g., 1—lowest priority and 10—highest priority), characteristically (e.g., urgent, high, medium, low), or the like. In some embodiments, the first work item may include one or more user interfaces to enable the user to execute the work item successfully. In this regard, the user may be required to access multiple user interfaces simultaneously to execute a work item.

As shown in block 204, the process flow includes processing the first work item, wherein processing the first work item comprises executing one or more sessions associated with the first work item. In this regard, the one or more sessions may be executed using the one or more user interfaces associated with the first work item. Next, as shown in block 206, the process flow includes receiving a notification from a first device, wherein the notification comprises a second work item, wherein the second work item requires a user action. In one aspect, the notification may include an audible alert, a vibratory alert, a flashing light on the user's workstation, or the like. In yet another aspect, the notification may include a phone call. In this regard, the phone call may be a voice over Internet telephony (VoIP) provisioning communications services (voice, fax, voice-messaging, or the like) over the Internet. In one aspect, the system may be configured to determine a priority level associated with the second work item. In some embodiments, the priority level associated with the second work item may be higher than the priority level associated with the first work item, thereby necessitating the need for interruption and its ad-hoc nature. In some other embodiments, the priority level associated with the second work item may equal to or lesser than the priority level of the first work item.

In response, the process flow includes retrieving the second work item, wherein retrieving the second work item comprises temporarily suspending the first work item and the one or more sessions associated with the first work item, as shown in block 208. In one aspect, the second work item may require a user execution of the user action associated with the second work item. In this regard, the user may accept the second work item to begin the retrieval process associated with the second work item. In one aspect, in response to accepting the second work item, the first work item is temporarily suspended. When suspending the first work item, the communicable link established with the queue is first disconnected. In doing so, the one or more user interfaces and the workflow associated with the first work item, including the one or more rules, and one or more sessions are temporarily suspended and stored in the volatile memory. In some embodiments, the system may be configured to retain the data in the volatile memory if the user intends to retrieve and complete execution of the first work item after the execution of the second work item during the same session. During the retrieval process, the first work item is transferred from the volatile memory into the non-volatile memory for processing. In this way, the system may be configured to quickly read data from the volatile memory. In some other embodiments, the system may be configured to transfer the data from the volatile memory to the non-volatile memory for permanent storage if the user does not intend to retrieve and complete the execution of the first work item after the execution of the second work item during the same session. However, in some embodiments, the user may have to complete the execution of a session associated with the first work item prior to signing out of the current session and transferring data from the volatile memory to the non-volatile memory.

In response, the system may be configured to initiate presentation of one or more user interfaces associated with the second work item. The user may execute the user action associated with the second work item using the one or more user interfaces presented to the user in response to the user acceptance of the second work item. By way of example, a user action may include a work item update, revising a work item session, quality assessment, or the like.

Next, as shown in block 210, the process flow includes determining execution of the user action associated with the second work item. In one aspect, the system may automatically detect that the user has executed the user action. In another aspect, the user may have to manually indicate to the system that the user action has been executed. In response, the process flow includes restoring the first work item and the one or more suspended sessions associated with the first work item based on at least determining the execution of the user action, as shown in block 212. In this regard, the system may be configured to receive one or more authentication credentials from the user in response to restoring the first work item and the one or more suspended sessions associated with the first work item. The system may then validate the one or more authentication credentials to determine a user access associated with restoring the first work item and the one or more suspended sessions associated with the first work item. Once the authentication credentials are verified, the system may then be configured to retrieve the first work item and the one or more suspended sessions associated with the first work item from the volatile memory. In response, the system may then be configured to restore the first work item and the one or more suspended sessions associated with the first work item.

Figure 3:
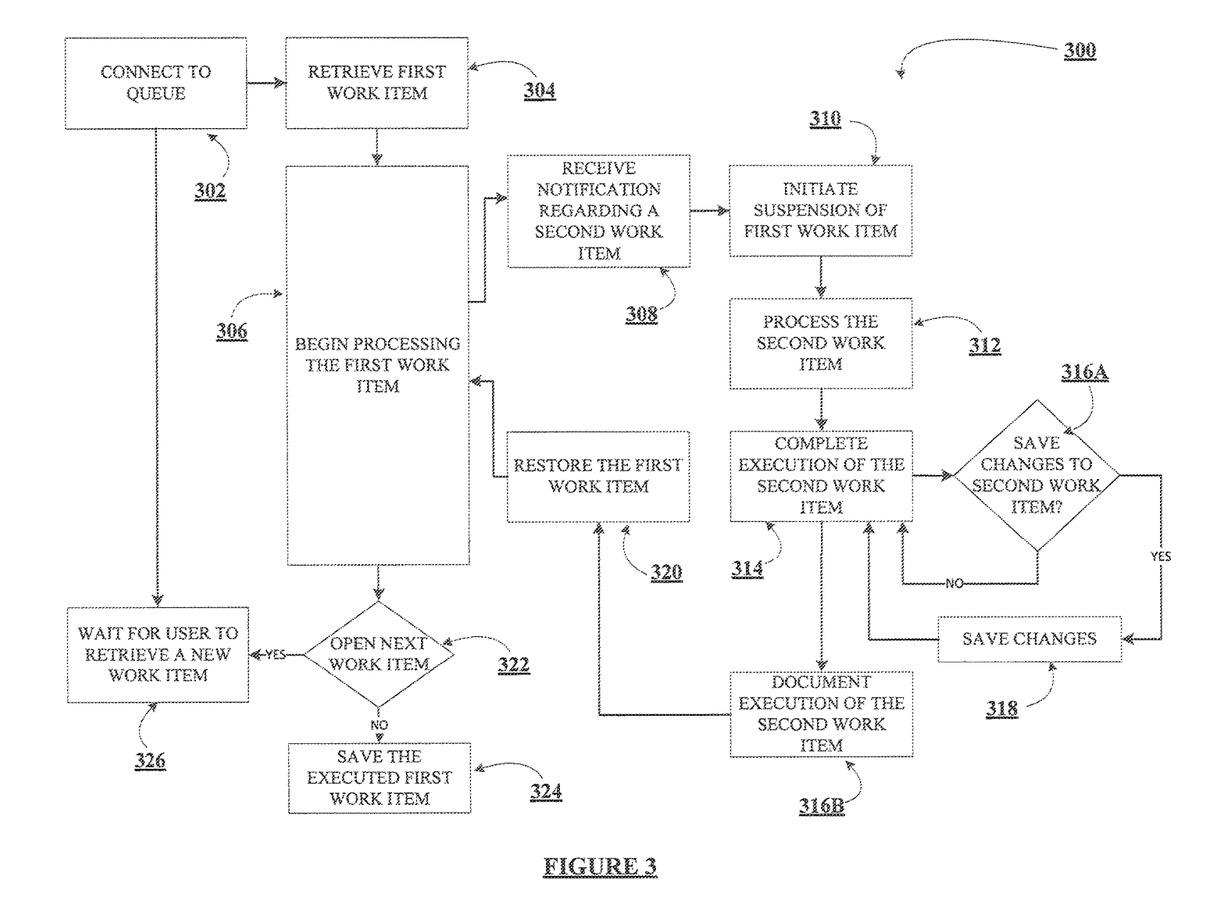
FIG. 3 illustrates a flow chart for handling the interruption of a current work session in accordance with an embodiment of the present invention.

FIG. 3 illustrates a flow chart for handling the interruption of a current work session 300. As shown in block 302, the flow chart begins by enabling the user to connect to a queue 302. In this regard, the system may be configured to establish a communicable link to necessitate the transference of information between multiple systems. In this way, the user may retrieve a first work item from the queue, as shown in block 304. In response, the user may begin processing the first work item, as shown in block 306. In some embodiments, to process the first work item, the user typically has to access multiple user interfaces associated with the retrieved work item for processing.

Next, as shown in block 308, the user's processing of the first work item may be interrupted by a notification regarding a second work item requiring one or more immediate user actions. The user actions may include a response for a particular question, reviewing one or more aspects of the second work item, or the like. In response, the system may enable the user to initiate suspension of the current work item as shown in block 310. In this regard, the system may be configured to enable the user to hide the one or more user interfaces associated with the first work item, thereby providing the user with an uncluttered work station to begin processing the second work item. In response to suspending the first work item, the system may be configured to enable the user to process the second work item, as shown in block 312. In one aspect, the user may be required to execute one or more user actions associated with the second work item. In this regard, the user may be required to access multiple user interfaces associated with the second work item. By suspending the first work item and the multiple user interfaces associated with the first work item, the system may be configured to provide the user with an uncluttered work space to efficiently process and complete execution of the second work item, as shown in block 314.

In some embodiments, in response to executing the second work item, the system may then determine whether the changes (e.g., updates, user actions, or the like) made to the second work item need to be saved, as shown in block 316A. In response, the system may enable the user to save the changes per the user's discretion 318. In some other embodiments, the execution of the work item may require mandatory documentation. In this regard, the user may be required to record/document the execution of the second work item, as shown in block 316B. In one aspect, a work item associated with asset collection may be categorized into one or more action codes. When making a change to a work item associated with asset collection, it is imperative that the change be recorded and categorized based on one or more action codes to determine the nature of the execution of the second work item. Typically, an action code may be a numeric code that defines and describes the type of action or change associated with the work item. For example, action code 17 may indicate an extension of an end date provided to the user. In some embodiments, the user may be required to submit a brief overview of the action executed on the second work item in addition to the action code to summarize the action.

Next, as shown in block 320, the process flow includes restoring the first work item. In this regard, the workflow associated with the first work item, including the multiple user interfaces that were initially suspended may be restored to enable the user to continue processing the first work item. Once the user completes the execution of the first work item, the system may enable the user to either open the next work item, as shown in block 322 or save the executed work item and end the session as shown in block 324. In some embodiments, in response to the execution of the first work item, the system may be configured to wait for the user to retrieve a new work item from the queue, as shown in block 326.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for electronically, temporarily suspending a workflow associated with a work item, the system comprising:
   one or more memory devices, wherein the one or more memory devices comprise a volatile memory and a non-volatile memory, wherein the volatile memory and the non-volatile memory are independent of each other;
   one or more processing devices operatively coupled to the one or more memory devices; and
   computer instruction code stored in the one or more memory devices and structured to cause the one or more processing devices to:
      establish a communicable electronic link with a queue to retrieve a first work item, wherein the first work item comprises a work flow, wherein the work flow comprises one or more rules, one or more sessions, one or more priority levels, and one or more user interfaces;
      process the first work item, wherein processing the first work item comprises executing one or more sessions associated with the first work item, wherein the one or more sessions is executed using the one or more user interfaces associated with the first work item;
      receive an electronic notification from a first device, wherein the notification comprises a second work item, wherein the second work item requires a user action;
      retrieve the second work item;
      temporarily suspend electronically the first work item and the workflow associated with the first work item in response to receiving the second work item, wherein processing the second work item comprises disconnecting the established communicable electronic link with the queue;
      determine execution of the user action associated with the second work item; and
      restore the first work item and one or more suspended sessions associated with the first work item based on at least determining the execution of the user action associated with the second work item, wherein restoring the first work item and the one or more suspended sessions further comprises re-establishing electronically the communicable link with the queue.

2. The system of claim 1, wherein temporarily suspending the first work item and the work flow associated with the first work item further comprises storing the one or more user interfaces and the one or more rules associated with the first work item in the volatile memory, thereby reducing a workload and increasing processing time during the processing of the second work item.

3. The system of claim 1, wherein the module is configured to further cause the one or more processing devices to:
   initiate presentation of the one or more user interfaces associated with the second work item; and
   determine the execution of the user action associated with the second work item using the one or more user interfaces associated with the second work item, wherein executing further comprises updating the second work item.

4. The system of claim 1, wherein the module is configured to further cause the one or more processing devices to:
   determine a priority level associated with the second work item, wherein the priority level associated with the second work item is higher than the priority level associated with the first work item.

5. The system of claim 1, wherein restoring the first work item and the one or more suspended sessions associated with the first work item further comprises restoring the one or more user interfaces associated with the first work item.

6. The system of claim 1, wherein the module is further configured to cause the one or more processing devices to:
   receive one or more authentication credentials from the user in response to restoring the first work item and the one or more suspended sessions associated with the first work item;
   validate the one or more authentication credentials to determine a user access associated with restoring the first work item and the one or more suspended sessions associated with the first work item;
   retrieve the first work item and the one or more suspended sessions associated with the first work item from the volatile memory in response to successfully validating the one or more authentication credentials; and
   restore the first work item and the one or more suspended sessions associated with the first work item.

7. The system of claim 1, wherein the module is further configured to further cause the one or more processing devices to:
   establish a communicable link with the first device to retrieve the second work item in response to disconnecting the communicable link with the queue.

8. A computer program product for temporarily suspending a workflow associated with a work item, the computer program product comprising a non-transitory computer-readable medium comprising code causing a first apparatus to:
   establish a communicable electronic link with a queue to retrieve a first work item, wherein the first work item comprises one or more rules, one or more sessions, one or more priority levels, and one or more user interfaces;
   process the first work item, wherein processing the first work item comprises executing one or more sessions associated with the first work item, wherein the one or more sessions is executed using the one or more user interfaces associated with the first work item;
   receive an electronic notification from a first device, wherein the notification comprises a second work item, wherein the second work item requires a user action;
   retrieve the second work item;
   temporarily suspend electronically the first work item and the work flow associated with the first work item in response to receiving the second work item, wherein processing the second work item comprises disconnecting the established communicable electronic link with the queue;
   determine execution of the user action associated with the second work item; and
   restore the first work item and one or more suspended sessions associated with the first work item based on at least determining the execution of the user action associated with the second work item, wherein restoring the first work item and the one or more suspended sessions further comprises re-establishing electronically the communicable link with the queue.

9. The computer program product of claim 8, wherein temporarily suspending the first work item and the work flow associated with the first work item further comprises storing the one or more user interfaces and the one or more rules associated with the first work item in a volatile memory, thereby reducing a workload and increasing processing time during the processing of the second work item.

10. The computer program product of claim 8, wherein the first apparatus is further configured to cause a processor to:
  initiate presentation of the one or more user interfaces associated with the second work item; and
  determine the execution of the user action associated with the second work item using the one or more user interfaces associated with the second work item, wherein executing further comprises updating the second work item.

11. The computer program product of claim 8, wherein the first apparatus is further configured to cause a processor to:
  determine a priority level associated with the second work item, wherein the priority level associated with the second work item is higher than the priority level associated with the first work item.

12. The computer program product of claim 8, wherein restoring the first work item and the one or more suspended sessions associated with the first work item further comprises restoring the one or more user interfaces associated with the first work item.

13. The computer program product of claim 8, wherein the first apparatus is further configured to cause a processor to, wherein the module is further configured to cause the one or more processing devices to:
  receive one or more authentication credentials from the user in response to restoring the first work item and the one or more suspended sessions associated with the first work item;
  validate the one or more authentication credentials to determine a user access associated with restoring the first work item and the one or more suspended sessions associated with the first work item;
  retrieve the first work item and the one or more suspended sessions associated with the first work item in response to successfully validating the one or more authentication credentials; and
  restore the first work item and the one or more suspended sessions associated with the first work item.

14. The computer program product of claim 8, wherein the first apparatus is further configured to cause a processor to:
  establish a communicable link with the first device to retrieve the second work item in response to disconnecting the communicable link with the queue.

15. A computer implemented method for temporarily suspending a workflow associated with a work item, the method comprising:
  establishing a communicable electronic link with a queue to retrieve a first work item, wherein the first work item comprises one or more rules, one or more sessions, one or more priority levels, and one or more user interfaces;
  processing the first work item, wherein processing the first work item comprises executing one or more sessions associated with the first work item, wherein the one or more sessions is executed using the one or more user interfaces associated with the first work item;
  receiving an electronic notification from a first device, wherein the notification comprises a second work item, wherein the second work item requires a user action;
  retrieving the second work item;
  temporarily suspending electronically the first work item and the work flow associated with the first work item in response to receiving the second work item, wherein processing the second work item comprises disconnecting the established communicable electronic link with the queue;
  determining execution of the user action associated with the second work item; and
  restoring the first work item and one or more suspended sessions associated with the first work item based on at least determining the execution of the user action associated with the second work item, wherein restoring the first work item and the one or more suspended sessions further comprises re-establishing electronically the communicable link with the queue.

16. The computer implemented method of claim 15, wherein temporarily suspending the first work item and the work flow associated with the first work item further comprises storing the one or more user interfaces and the one or more rules associated with the first work item in a volatile memory, thereby reducing a workload and increasing processing time during the processing of the second work item.

17. The computer implemented method of claim 15, wherein the method further comprises:
  initiating presentation of the one or more user interfaces associated with the second work item; and
  determining the execution of the user action associated with the second work item using the one or more user interfaces associated with the second work item, wherein executing further comprises updating the second work item.

18. The computer implemented method of claim 15, wherein the method further comprises determining a priority level associated with the second work item, wherein the priority level associated with the second work item is higher than the priority level associated with the first work item.

19. The computer implemented method of claim 15, wherein restoring the first work item and the one or more suspended sessions associated with the first work item further comprises restoring the one or more user interfaces associated with the first work item.

20. The computer implemented method of claim 15, wherein the method further comprises:
  receive one or more authentication credentials from the user in response to restoring the first work item and the one or more suspended sessions associated with the first work item;
  validate the one or more authentication credentials to determine a user access associated with restoring the first work item and the one or more suspended sessions associated with the first work item;
  retrieve the first work item and the one or more suspended sessions associated with the first work item from a volatile memory in response to successfully validating the one or more authentication credentials.

* * * * *